(12) United States Patent
Priedeman, Jr.

(10) Patent No.: US 7,910,041 B1
(45) Date of Patent: Mar. 22, 2011

(54) BUILD MATERIALS CONTAINING NANOFIBERS FOR USE WITH EXTRUSION-BASED LAYERED DEPOSITIONS SYSTEMS

(75) Inventor: William R. Priedeman, Jr., Long Lake, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 12/001,403

(22) Filed: Dec. 11, 2007

Related U.S. Application Data

(63) Continuation of application No. 11/986,717, filed on Nov. 26, 2007, now abandoned.

(60) Provisional application No. 60/861,147, filed on Nov. 27, 2006.

(51) Int. Cl.
- B29C 33/40 (2006.01)
- B28B 1/14 (2006.01)
- B28B 7/30 (2006.01)
- H05B 6/00 (2006.01)

(52) U.S. Cl. ........ 264/319; 264/219; 264/308; 264/317; 264/327; 264/464; 264/313

(58) Field of Classification Search ............ None
See application file for complete search history.

(56) References Cited

U.S. PATENT DOCUMENTS

| | | | |
|---|---|---|---|
| 4,665,492 A | 5/1987 | Masters | |
| 5,121,329 A | 6/1992 | Crump | |
| 5,134,569 A | 7/1992 | Masters | |
| 5,216,616 A | 6/1993 | Masters | |
| 5,303,141 A | 4/1994 | Batchelder et al. | |
| 5,340,433 A | 8/1994 | Crump | |
| 5,503,785 A | 4/1996 | Crump et al. | |
| 5,653,925 A | 8/1997 | Batchelder | |
| 5,695,707 A | 12/1997 | Almquist et al. | |
| 5,866,058 A | 2/1999 | Batchelder et al. | |
| 5,939,008 A | 8/1999 | Comb et al. | |
| 6,022,207 A | 2/2000 | Dahlin et al. | |
| 6,129,872 A | 10/2000 | Jang | |
| 6,133,355 A | 10/2000 | Leyden et al. | |
| 6,162,378 A | 12/2000 | Bedal et al. | |
| 6,228,923 B1 | 5/2001 | Lombardi et al. | |
| 6,600,965 B1 | 7/2003 | Hull et al. | |

(Continued)

FOREIGN PATENT DOCUMENTS

WO    0192381 A1    12/2001

OTHER PUBLICATIONS

General Electric Ultem 1010, GE Plastics (2003).*

(Continued)

*Primary Examiner* — D. Lawrence Tarazano
*Assistant Examiner* — Camie S Thompson
(74) *Attorney, Agent, or Firm* — Brian R. Morrison; Westman, Champlin & Kelly, P.A.

(57) ABSTRACT

A method for building a three-dimensional object, the method comprising extruding a build material having a temperature profile between a surface and a central region of the extruded build material in which the surface has a higher temperature than the central region of the build material. The build material comprises a carrier material and nanofibers.

20 Claims, 4 Drawing Sheets

U.S. PATENT DOCUMENTS

| | | | |
|---|---|---|---|
| 6,645,412 B2 * | 11/2003 | Priedeman, Jr. | 264/219 |
| 6,709,566 B2 * | 3/2004 | Cumings et al. | 205/641 |
| 6,722,872 B1 | 4/2004 | Swanson et al. | |
| 6,776,602 B2 | 8/2004 | Swanson et al. | |
| 6,814,907 B1 | 11/2004 | Comb | |
| 6,866,807 B2 | 3/2005 | Comb et al. | |
| 6,934,600 B2 | 8/2005 | Jang et al. | |
| 2005/0103360 A1 | 5/2005 | Tafoya | |
| 2005/0173838 A1 | 8/2005 | Priedeman, Jr. et al. | |
| 2007/0003656 A1 | 1/2007 | LaBossiere et al. | |

OTHER PUBLICATIONS

Conductive Polymer Composties: Infle of Extrusion Conditions on Positive Temperature Coffecient Effect of Poly(butylene terephthalate)/Poly(olefin)-Carbon Black Blends, J.F. Feller, 2003 Wiley Periodicals, Inc. J. Appl Polym Sci 91:2151-2157, 2004.*

Ultem PEI Resin product brochure, Sabic Innovative Plastics Engineering Thermoplastics Product Guide, Sabic Innovative Plastics, 2007 (48 pages).

* cited by examiner

US 7,910,041 B1

BUILD MATERIALS CONTAINING NANOFIBERS FOR USE WITH EXTRUSION-BASED LAYERED DEPOSITIONS SYSTEMS

CROSS-REFERENCE TO RELATED APPLICATION(S)

This application is a continuation of application Ser. No. 11/986,717, filed on Nov. 26, 2007, which claims priority to U.S. Provisional Application No. 60/861,147, filed on Nov. 27, 2006, both entitled "Build Materials Containing Nanofibers For Use With Extrusion-Based Layered Deposition Systems", the disclosures of which are incorporated by reference in their entireties.

BACKGROUND

The present invention relates to the fabrication of three-dimensional (3D) objects using extrusion-based layered deposition systems. In particular, the present invention relates to the fabrication of 3D objects from build materials containing nanofibers.

An extrusion-based layered deposition system (e.g., fused deposition modeling systems developed by Stratasys, Inc., Eden Prairie, Minn.) is used to build a 3D object from a computer-aided design (CAD) model in a layer-by-layer manner by extruding a flowable build material. The build material is extruded through a nozzle carried by an extrusion head, and is deposited as a sequence of roads on a substrate in an x-y plane. The extruded build material fuses to previously deposited build material, and solidifies upon a drop in temperature. The position of the extrusion head relative to the base is then incremented along a z-axis (perpendicular to the x-y plane), and the process is then repeated to form a 3D object resembling the CAD model.

Movement of the extrusion head with respect to the base is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited from a second extrusion tip pursuant to the generated geometry during the build process. The support material adheres to the build material during fabrication, and is removable from the completed 3D object when the build process is complete.

SUMMARY

The present invention relates to a method for building a 3D object with an extrusion-based layered deposition system. The method includes feeding a build material to an extrusion component of the extrusion-based layered deposition system, where the build material includes a carrier material and nanofibers. The method further includes extruding the build material from the extrusion component, where the extruded build material has a surface, a central region, and a temperature profile between the surface and the central region in which the surface has a higher temperature than a central region of the extruded build material.

DETAILED DESCRIPTION

Figure 1:
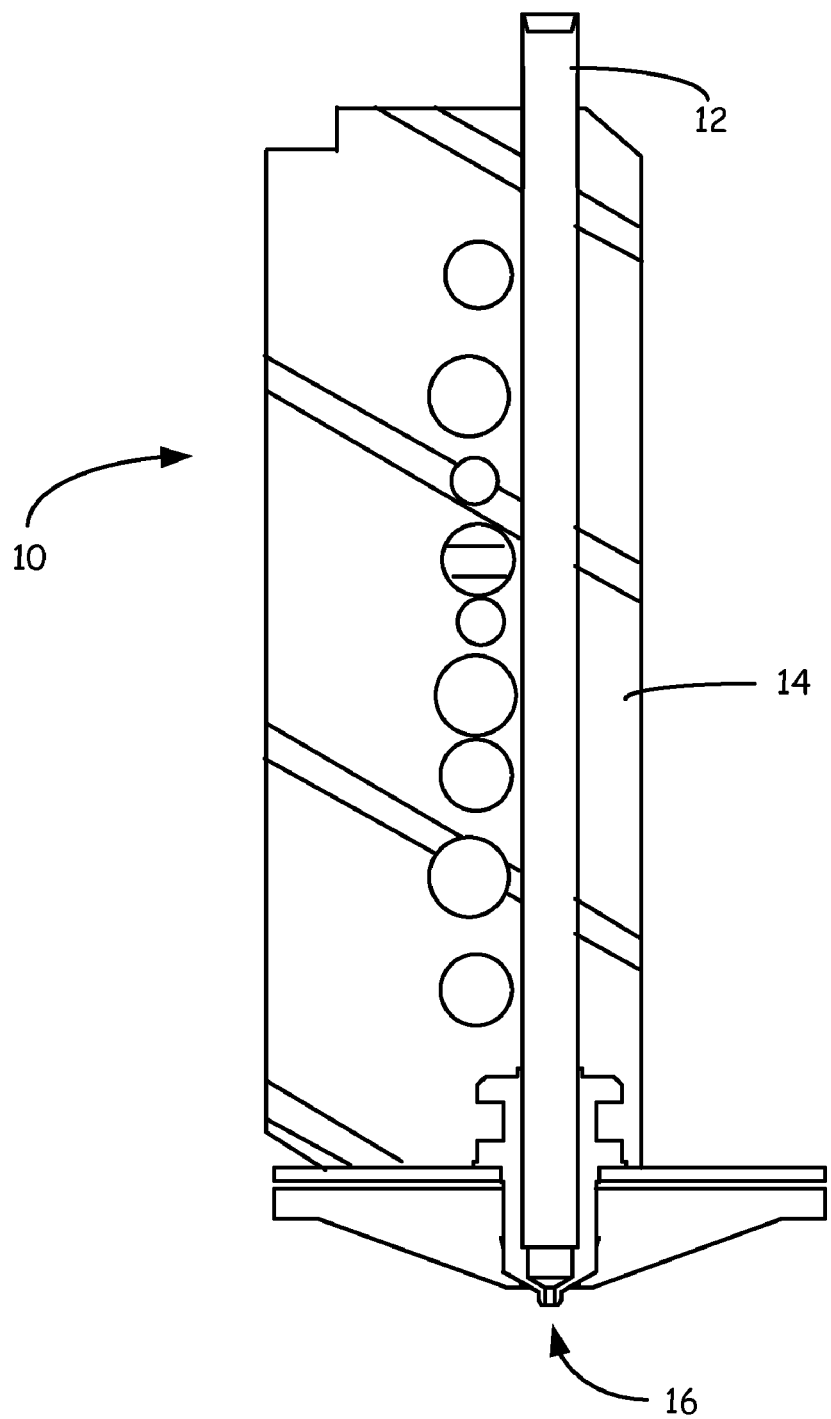
FIG. 1 is a sectional view of an extrusion component of an extrusion-based layered deposition system.

FIG. 1 is a sectional view of extrusion component 10 of an extrusion-based layered deposition system, which includes extrusion channel 12, liquefier block 14, and extrusion tip 16. Examples of suitable extrusion-based layered deposition systems that extrusion component 10 may be used with include fused deposition modeling systems commercially available under the trademark FDM® from Stratasys, Inc., Eden Prairie, Minn.

Extrusion channel 12 is a channel extending through liquefier block 14 for feeding a solidified filament of a build material, where the build material includes a thermoplastic material doped with nanofibers. Liquefier block 14 is a heating block for melting the build material to a desired extrusion viscosity based on a suitable thermal profile along liquefier block 14. Examples of suitable heating blocks for liquefier block 14 include those commercially available in fused deposition modeling systems under the trademark FDM TITAN® from Stratasys, Inc., Eden Prairie, Minn.

Extrusion tip 16 is the tip extension of liquefier block 12, which shears and extrudes the melted build material to form a 3D object. Extrusion tip 16 has a tip diameter for depositing roads of the build material, where the road widths and heights are based in part on the tip diameter. Examples of suitable tip inner diameters for extrusion tip 16 range from about 100 micrometers (about 4 mils) to about 1000 micrometers (about 40 mils). In an alternative embodiment (not shown), the extrusion tip is configured to extrude a ribbon having a suitable thicknesses ranging from about 100 micrometers to about 1,000 micrometers, with particularly suitable thicknesses ranging from about 1 millimeter to about 100 millimeters.

Figure 2:
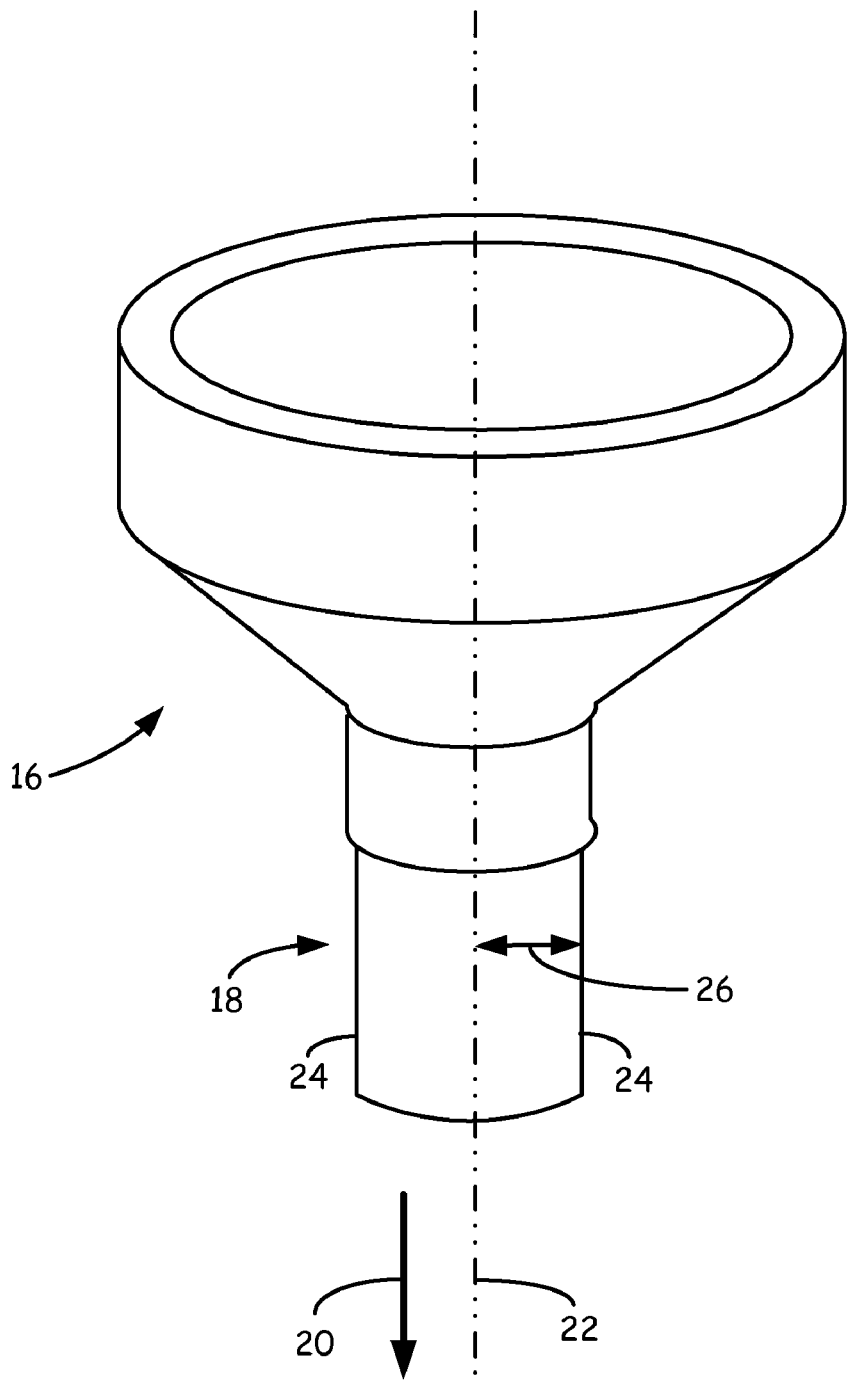
FIG. 2 is an expanded perspective view of an extrusion tip of the extrusion component.

FIG. 2 is an expanded perspective view of extrusion tip 16, showing extrudate 18 of the build material being extruded from extrusion tip 16 in the direction of arrow 20. As shown, extrudate 18 extends along axis 22, and includes surface 24, which is an exterior surface disposed circumferentially around axis 22. Extrudate 18 also includes radius 26 between axis 22 and surface 24, where radius 26 of extrudate 18 is generally defined by the tip diameter of extrusion tip 16.

As discussed above, extrudate 18 is derived from the melted build material containing a thermoplastic material doped with nanofibers. The build material may be provided to extrusion component 10 (shown in FIG. 1) in a variety of different media. For example, the build material may be provided as a filament strand fed into extrusion channel 12 (shown in FIG. 1), as disclosed in Swanson et al., U.S. Pat. No. 6,923,634 and Comb et al., U.S. Publication No. 2005/0129941. Alternatively, the build material may be provided as other forms of media (e.g., pellets and resins) from other types of storage and delivery components (e.g., supply hoppers or vessels). As discussed below, the nanofibers in the melted build material of extrudate 18 have a concentration profile in the thermoplastic material that varies along radius 26, where a greater concentration of the nanofibers is located adjacent surface 24.

Figure 3:
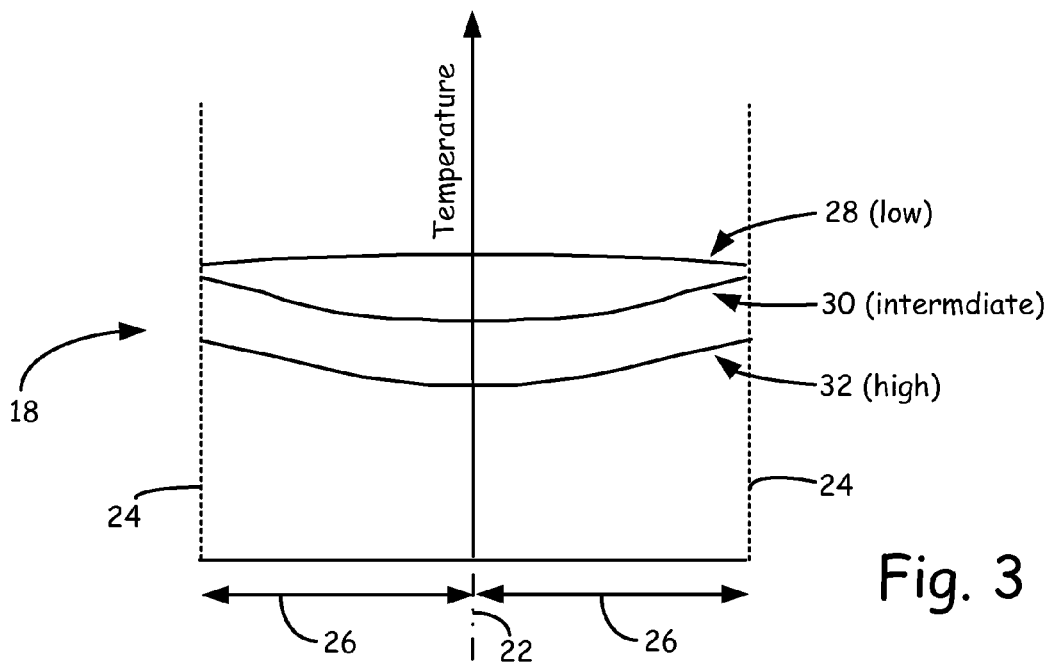
FIG. 3 is a graph of measured temperature profiles of extrudates versus the radii of the extrudates for three different flow rates of build material.

FIG. 3 is a graph of predicted temperature profiles of extrudates (i.e., melted build material) versus the radii of the extrudates for three different flow rates of a build material, where the build material included a thermoplastic material doped with nanotube fibers. The temperatures of the extrudates may be measured with a small thermocouple on a mechanical stage, and analyzed as a function of parameters such as liquefier geometry and total flow rate. For ease of discussion, the reference labels used in FIGS. 1 and 2 are used herein to describe the profiles. Thus, FIG. 3 is a graph of measured temperature profiles of three different extrudates 18 versus radius 26 for the corresponding extrudate 18.

The three different flow rates include a low extrusion flow rate (low rate 28), a moderate extrusion flow rate (moderate rate 30), and a high extrusion flow rate (high rate 32). Low rate 28 is an extrusion rate where the dwell time of the build material passing through liquefier block 14 is substantially greater than the time required for the heat to transfer from surface 24 to the center of the build material at axis 22 (i.e., for the heat to transfer across radius 26). As such, the center of the build material at axis 22 is fully heated when extrudate emerges from extrusion tip 16.

Moderate rate 30 is an extrusion rate where the dwell time of the build material passing through liquefier block 14 is about the same as the time required for the heat to transfer from surface 24 to the center of the build material at axis 22. As such, the center of the build material at axis 22 is still heating up when extrudate 18 emerges from extrusion tip 16.

High rate 32 is an extrusion rate where the dwell time of the build material passing through liquefier block 14 is substantially less than the time required for the heat to transfer from surface 24 to the center of the build material at axis 22. As such, the center of the build material at axis 22 is not heated when extrudate emerges from extrusion tip 16.

As shown in FIG. 3, at low rate 28, the temperature profile is close to uniform, as one would expect. Typically, a temperature profile of an extrudate exhibits a flat, uniform temperature along its radius, or higher temperatures near its axis and cooler temperatures at its outer surface. However, the temperature profiles for moderate rate 30 and high rate 32 do not follow the patterns that one would expect. Instead, the temperatures are highest near surface 24 and lowest at axis 22. This is believed to be due to the thermal profile along liquefier block 14, where cold build material is being pressed into a heated metal tube (i.e., extrusion channel 12, shown in FIG. 1) and melted. The heat transfers slowly from extrusion channel 12 to the center of the build material (at axis 22). If the dwell time of the build material in liquefier block 14 is similar to the time for heat to reach the center of the build material (e.g., for moderate rate 30), the core of the build material will still be heating up when extrudate 18 emerges from extrusion tip 16.

The viscosities of thermoplastic materials are dependent on the temperatures of the thermoplastic materials, particularly between the glass transition temperatures and the solidification temperatures. As such for moderate rate 30 and high rate 32, the build material at the center of extrudate 18 (at axis 22) has a higher viscosity relative to the build material at surface 24. This correspondingly affects the concentration profile of the nanofibers (e.g., nanotube fibers) in the thermoplastic material along radius 26.

When a fluid (e.g., the melted build material) is flowing through a cylindrical pipe (e.g., extrusion channel 12 and extrusion tip 16) filled with a fluid of constant viscosity, particles in the fluid tend to congregate toward the axis of flow (so long as criteria for settling are not satisfied). This effect can be understood as minimizing the energy dissipation of the flow, since the fluid with a lower particle concentration, and hence a lower viscosity, migrates to regions of higher shear near the walls of the cylindrical pipe. However, if the fluid has a higher viscosity near the axis of the flow and a lower viscosity near the walls, this segregation effect apparently can be reversed. With respect to extrusion component 10 and extrudate 18 at moderate rate 30 and high rate 32, because the viscosity of the build material at the center of extrudate 18 (i.e., at axis 22) is greater than the viscosity of the build material adjacent surface 24, it is energetically favorable for the nanofibers to congregate adjacent surface 24.

The flow of the melted build material distributes itself to minimize its average energy dissipation. It is also noted that the nanofibers also increase the viscosity of the build material, where the viscosity increase is proportional to the concentration of the nanofibers in the thermoplastic material. A believed basis for this anomalous segregation of nanofibers to the surface appears to be that the increase in viscosity in the build material due to the addition of the nanofibers in the thermoplastic material is not as great as the increase in viscosity of the build material due to a lower temperature at the extrudate core (e.g., the difference in temperature between the build material at surface 24 and the build material at axis 22).

Thus, when extruding the build material such the build material exhibits viscosity variations along the radius of the build material such that the center of the extrudate is cooler than its surface (e.g., at moderate rate 30 and high rate 32), the concentration of the nanofibers is greater adjacent the surface (e.g., surface 24) compared to the concentration of the nanofibers adjacent the center of the extrudate (e.g., at axis 22 of extrudate 18).

Accordingly, extruding build materials containing thermoplastic materials doped with nanofibers, where the build material is extruded with a viscosity variation along the radius of the extrudate, provides a suitable means for distributing a higher concentration of the nanofibers adjacent the surface of the extrudate compared to the center of the extrudate. As discussed below, this is particularly suitable for building 3D objects that have electrostatic discharge and shielding properties.

Examples of suitable thermoplastic materials for use in the build material include acrylonitrile-butadiene-styrenes (ABS), polycarbonates, polyphenylsulfones, polysulfones, nylons, polystyrenes, amorphous polyamides, polyetherimides, polyesters, polyphenylene ethers, polyurethanes, polyetheretherketones, fluoropolymers, and combinations thereof. Examples of suitable commercially available thermoplastic materials for use in the build material include amorphous polyetherimides available under the trademark ULTEM® resins from General Electric Company, Fairfield, Conn. Suitable concentrations of the thermoplastic material in the build material range from about 50.0% by volume to about 99.9% by volume, with particularly suitable concentrations ranging from about 75.0% by volume to about 95.0% by volume, and with even more particularly suitable concentration ranging from about 85.0% by volume to about 90.0% by volume, based on an entire volume of the build material.

While the build material of the present invention is discussed with reference to a thermoplastic material, the present invention is also suitable for use with any carrier material that is capable of forming a viscosity gradient between its outer surface and its central region. Examples of alternative materials include metals (e.g., aluminum, magnesium, and alloys thereof), that are cooled to their viscous intermediate state.

Examples of suitable nanofibers for use in the build material include nanotube fibers, nanowire fibers, and combinations thereof. Examples of suitable nanotube fibers include carbon-based nanotubes (e.g., graphite nanotubes) having an average diameter of about one nanometer. Examples of particularly suitable nanotube fibers include single-walled, carbon-based nanotubes, which exhibit electrical properties. Examples of suitable nanowire fibers include metallic (e.g., Ni, Pt, and Au) nanowire fibers, semiconducting (e.g., InP, Si, and GaN) nanowire fibers, and insulating (e.g., $SiO_2$ and $TiO_2$) nanowire fibers. Examples of particularly suitable nanowire fibers include semiconducting nanowire fibers. Suitable dimensions for the nanowire fibers include wires having diameters of about 10 nanometers or less with lengths in the micrometer range (e.g., several hundred micrometers in length). Particularly suitable diameters for the nanowire fibers include about one nanometer or less.

Suitable concentrations of the nanofibers in the build material range from about 0.1% by volume to about 50.0% by volume, with particularly suitable concentrations ranging from about 5.0% by volume to about 25.0% by volume, and with even more particularly suitable concentration ranging from about 10.0% by volume to about 15.0% by volume, based on an entire volume of the build material.

The higher concentration of nanotube fibers adjacent the surface of the extrudate (e.g., surface 24) was noted by the high electrical conductivities of deposited layers and 3D objects formed with the build material at moderate and high extrusion rates (e.g., moderate rate 30 and high rate 32). As discussed above, carbon-based nanotube fibers exhibit electrical properties (e.g., high electrical conductivities). Electrical currents typically flow adjacent the outer surfaces of an object. When such electrical currents encounter a deposited layer formed by extruding the build material with an extrusion-based layered deposition system (which creates a temperature profile along the radius of the extrudate), the high electrical conductivity allows the electrical current to flow, thereby imparting electrostatic discharge and shielding properties.

Fracture resistance is another value that can be added to a build material by the inclusion of fillers such as particles or filaments. In particular, since cracks generally originate at surfaces of an object that are under tension, additional benefit might be expected from increasing the local concentration of the filler (e.g., nanofibers) at the surface.

Figure 4:
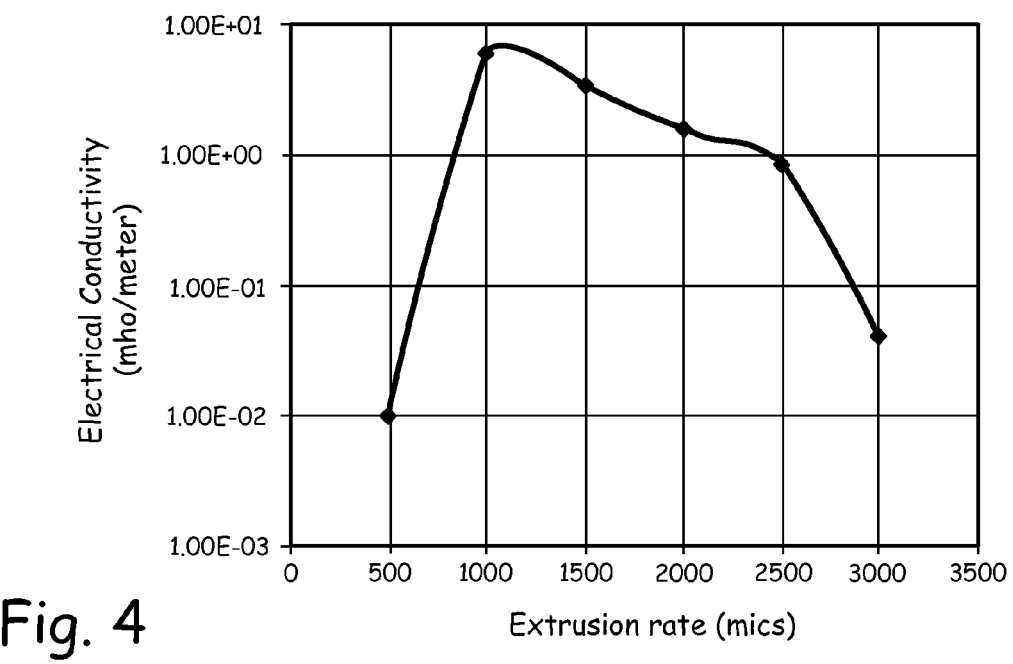
FIG. 4 is a graph of electrical conductivities of deposited layers formed with build material, and measured as a function of extrusion rates.

FIG. 4 is graph of electrical conductivities of deposited layers formed with the build material, and measured as a function of extrusion rates. The measurements were performed with an extrusion-based layered deposition system commercially available under the trademark FDM TITAN® from Stratasys, Inc., Eden Prairie, Minn., with temperature set points of 350° C. and 145° C. The vertical axis is shown in units of mho/meter, and the horizontal is shown in units of micro-cubic-inches-per-second (mics). The free filament diameter was about 330 micrometers (about 13 mils). Data was acquired by dabbing silver paint on a 2-millimeter stretch of filament, repeating this every 15.2 centimeters (6 inches). After drying for an hour, an ohm meter was used to measure the average resistance between each 6-inch segment. Contact resistance with the silver paint appeared to be less than 100 kilo-ohms, while typical resistances were 300 kilo-ohms to 170 mega-ohms.

As shown in FIG. 4, the maximum electrical conductivity was at about 1,100 mics, and was almost 3 orders of magnitude change from the average electrical conductivity exhibited by the build materials. In comparison, bulk graphite has a conductivity of about $1.3 \times 10^5$ mho/meter, or about 10,000 time more than shown in FIG. 4. Accordingly, in one embodiment, 3D objects formed by extruding the build material exhibit electrical conductivities that provide electrostatic discharge and shielding properties, even with low concentrations of nanotube fibers in the build material.

A comparative experiment was conducted involving an injection molding process. In this experiment, the same build material was melted and injected to form a 3D object. However, the injected build material did not exhibit a temperature profile along a radius of the injected material. As such, the nanotube fibers did not migrate toward the outer-diameter surface of the injected material. Accordingly, the resulting injection-molded 3D object did not exhibit electrical conductivities on par with those of the 3D object formed via an extrusion-based layered deposition system.

Figure 5:
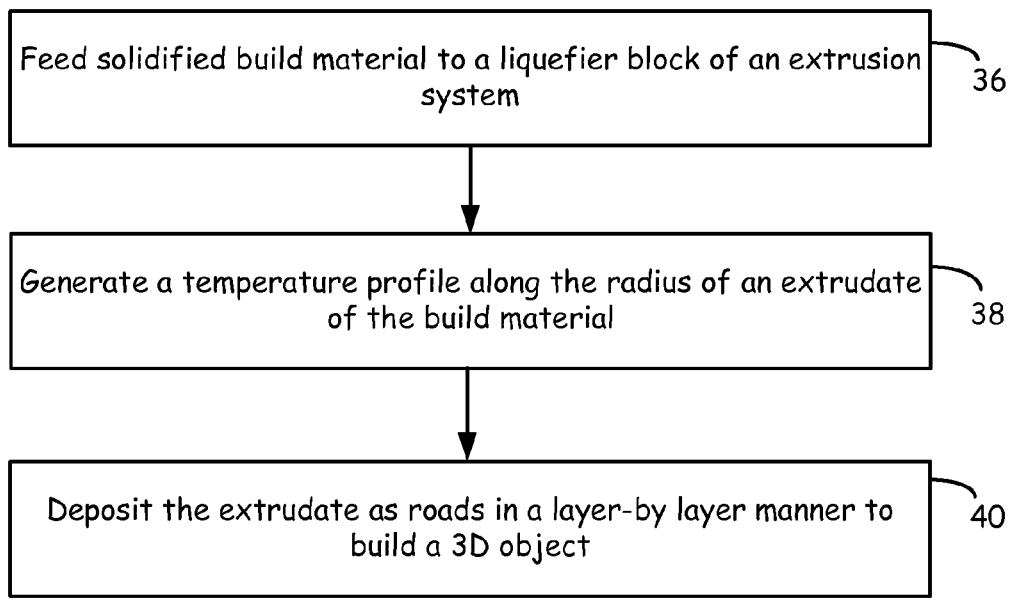
FIG. 5 is a flow diagram of a method of forming a 3D object with a extruded build material, pursuant to the present invention.

FIG. 5 is a flow diagram of method 34 for building a 3D object having electrostatic discharge and/or shielding properties. Method 34 includes steps 36, 38, and 40, and initially involves feeding build material to a liquefier block (e.g., liquefier block 14) of an extrusion system (step 36). Suitable extrusion systems includes extrusion-based layered deposition systems, as discussed above. The build material includes a thermoplastic material doped with conductive or semiconductive nanofibers.

As the build material passes through the liquefier block, the heat from the liquefier block transfers into the build material, thereby heating up and melting portions of the build material. The extrudate of the build material (e.g., extrudate 18) desirably has a temperature profile generated along its radius (e.g., radius 26) as the extrudate exits the extrusion tip (e.g., extrusion tip 16) (step 38). This may be performed by moving the build material through the liquefier block and the extrusion tip at a flow/extrusion rate that is sufficient for providing a dwell time of the build material passing through the liquefier block that is about the same as the time required for the heat to transfer from the outer circumferential surface to the center of the build material (e.g., moderate rate 30), or less (e.g., moderate rate 32). It is understood that generating a temperature profile along the radius of the extrudate also generates a temperature profile along the diameter of the extrudate (as shown in FIG. 3) because the liquefier block extends circumferentially around the build material.

The temperature profile along the radius of the extrudate correspondingly creates a viscosity profile along the radius of the extrudate due (at least in part) to the temperature effect on the thermoplastic material. This viscosity profile causes the nanofibers to congregate at the lower viscosity regions adjacent the outer circumferential surface to minimize the energy density of the extrudate. The extrudate is then deposited as roads in layer-by-layer manner to build a 3D object (step 40). In one embodiment, the 3D object may be a single or multiple-layer film that functions as a electrostatic discharge film. The electrostatic discharge film may then be applied to various objects (e.g., electronics) to reduce electrical static build up.

Figure 6:
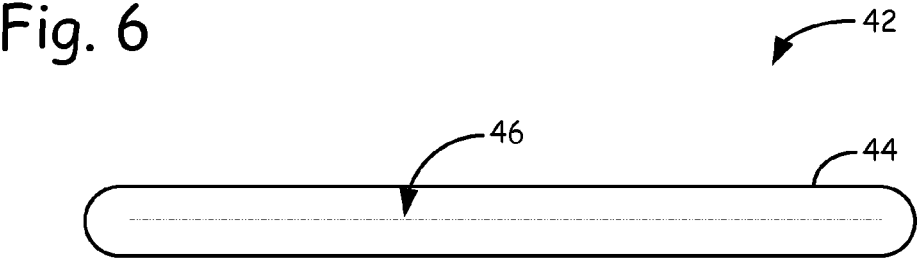
FIG. 6 is a top view of an alternative extrudate.

FIG. 6 is a top view of extrudate 42, which is an alternative to extrudate 18 (shown in FIG. 2). As shown, extrudate 42 has a non-cylindrical shape, and is extruded from a non-cylindrical extrusion tip to form a film or ribbon. Thus, the present invention may be used with extrudate having a variety of different geometric shapes.

Extrudate 42 includes surface 44 (i.e., an outer surface) and central region 46, and does not have a single radius between surface 44 and central region 46. Thus, the temperature profile between surface 44 and central region 46 may vary based on the heat transfer rates through the build material. However, extrudate 42 may be extruded in the same manner as extrudate 42 to provide one or more temperature profiles between surface 44 and central region 46, where the temperatures are greater at surface 44 compared to central region 46.

The temperature profiles between surface 44 and central region 46 correspondingly create one or more viscosity profiles between surface 44 and central region 46 due (at least in part) to the temperature effects on the thermoplastic material. These one or more viscosity profiles cause the nanofibers to congregate at the lower viscosity regions adjacent the outer surface (i.e., surface 44) to minimize the dissipated shear energy density of the extrudate.

Although the present invention has been described with reference to preferred embodiments, workers skilled in the art will recognize that changes may be made in form and detail without departing from the spirit and scope of the invention.

The invention claimed is:

1. A method for building a three-dimensional object with an extrusion-based layered deposition system, the method comprising:
    feeding a build material to an extrusion component of the extrusion-based layered deposition system, the build material comprising a carrier material and nanofibers;
    melting the carrier material of the build material in the extrusion component to form a melt comprising the carrier material and the nanofibers, the melt having an axial temperature profile;
    extruding the melt from the extrusion component at an extrusion rate ranging from about 800 mics to about 2,500 mics, wherein the extruded melt has a surface and a central region, and further comprises:
        a viscosity profile between the surface and the central region based in part on the axial temperature profile, the viscosity profile exhibiting a higher viscosity of the build material adjacent to the surface compared to the central region; and
        a concentration profile of the nanofibers between the surface and the central region based on the viscosity profile, wherein the nanofiber concentration profile exhibits a higher concentration of the nanofibers adjacent to the surface compared to the central region; and
    depositing the extruded melt in a layer-by-layer manner to build at least a portion of the three-dimensional object.

2. The method of claim 1, wherein extruding the melt from the extrusion component comprises extruding the melt from an extrusion tip of the extrusion component, the extrusion tip having an inner diameter ranging from about 100 micrometers to about 1,000 micrometers.

3. The method of claim 1, further comprising providing the build material to the extrusion-based layered deposition system as a filament.

4. The method of claim 1, wherein the carrier material comprises a thermoplastic material present in the build material at a concentration ranging from about 50.0% by volume to about 99.9% by volume.

5. The method of claim 4, wherein the thermoplastic material is present in the build material at a concentration ranging from about 75.0% by volume to about 95.0% by volume.

6. The method of claim 5, wherein the thermoplastic material is present in the build material at a concentration ranging from about 85.0% by volume to about 90.0% by volume.

7. The method of claim 1, wherein the nanofibers are present in the build material at a concentration ranging from about 50.0% by volume to about 99.9% by volume.

8. The method of claim 7, wherein the nanofibers are present in the build material at a concentration ranging from about 5.0% by volume to about 25.0% by volume.

9. The method of claim 8, wherein the nanofibers are present in the build material at a concentration ranging from about 10.0% by volume to about 15.0% by volume.

10. The method of claim 1, wherein the carrier material comprises a thermoplastic material selected from the group consisting of acrylonitrile-butadiene-styrenes, polycarbonates, polyphenylsulfones, polysulfones, nylons, polystyrenes, polyamides, polyetherimides, polyesters, polyphenylene ethers, polyurethanes, polyetheretherketones, fluoropolymers, and combinations thereof.

11. The method of claim 1, wherein the nanofibers are selected from the group consisting of nanotube fibers, nanowire fibers, and combinations thereof.

12. A method for building a three-dimensional object with an extrusion-based layered deposition system having an extrusion head, the method comprising:
    feeding a build material to a liquefier of the extrusion head, the build material comprising a carrier material and nanofibers;
    at least partially melting the carrier material in the liquefier to form a melt of the carrier material and the nanofibers, the melt having an axial temperature profile;
    generating a viscosity profile between a surface and a central region of the melt based in part on the axial temperature profile, the viscosity profile exhibiting a higher viscosity of the build material adjacent to the surface compared to the central region:
    generating a concentration profile of the nanofibers between the surface and the central region based on the viscosity profile, wherein the nanofibers concentration profile exhibits a higher concentration of the nanofibers adjacent to the surface compared to the central region; and
    depositing the melt from the extrusion head at a rate ranging from about 800 mics to about 2,500 mics, in a layer-by-layer manner to build at least a portion of the three-dimensional object.

13. The method of claim 12, wherein the carrier material comprises a thermoplastic material present in the build material at a concentration ranging from about 50.0% by volume to about 99.9% by volume.

14. The method of claim 12, wherein the nanofibers are present in the build material at a concentration ranging from about 50.0% by volume to about 99.9% by volume.

15. The method of claim 12, wherein the carrier material comprises a thermoplastic material selected from the group consisting of acrylonitrile-butadiene-styrenes, polycarbonates, polyphenylsulfones, polysulfones, nylons, polystyrenes, polyamides, polyetherimides, polyesters, polyphenylene ethers, polyurethanes, polyetheretherketones, fluoropolymers, and combinations thereof.

16. The method of claim 12, wherein the nanofibers are selected from the group consisting of nanotube fibers, nanowire fibers, and combinations thereof.

17. The method of claim 12, and further comprising providing the build material to the extrusion-based layered deposition system as a filament.

18. The method of claim 12, wherein the deposited melt has a non-cylindrical shape.

19. The method of claim 12, wherein depositing the melt from the extrusion head comprises extruding the melt from an extrusion tip of the extrusion head, the extrusion tip having an inner diameter ranging from about 100 micrometers to about 1,000 micrometers.

20. The method of claim 12, wherein the carrier material comprises a thermoplastic material, and wherein the nanofibers comprise carbon nanotube fibers that are present in the build material at a concentration ranging from about 5.0% by volume to about 25.0% by volume.

\* \* \* \* \*

UNITED STATES PATENT AND TRADEMARK OFFICE
CERTIFICATE OF CORRECTION

PATENT NO.        : 7,910,041 B1
APPLICATION NO.   : 12/001403
DATED             : March 22, 2011
INVENTOR(S)       : William R. Priedeman, Jr.

Page 1 of 1

It is certified that error appears in the above-identified patent and that said Letters Patent is hereby corrected as shown below:

In the Claims

Column 7, Claim 3:
Line 58, after "claim 1", insert --and--

Signed and Sealed this
Twenty-sixth Day of November, 2013

Margaret A. Focarino
*Commissioner for Patents of the United States Patent and Trademark Office*